(12) United States Patent
Hsiao (10) Patent No.: US 9,242,517 B2
(45) Date of Patent: Jan. 26, 2016

(54) TIRE PRESSURE MONITOR CAP

(71) Applicant: Chien-Chuan Hsiao, New Taipei (TW)

(72) Inventor: Chien-Chuan Hsiao, New Taipei (TW)

( * ) Notice: Subject to any disclaimer, the term of this patent is extended or adjusted under 35 U.S.C. 154(b) by 122 days.

(21) Appl. No.: 14/177,239

(22) Filed: Feb. 11, 2014

(65) Prior Publication Data

US 2015/0224832 A1   Aug. 13, 2015

(51) Int. Cl.
*E01C 23/00* (2006.01)
*G01M 17/02* (2006.01)
*B60C 23/02* (2006.01)
*B60C 23/04* (2006.01)

(52) U.S. Cl.
CPC .................................. *B60C 23/0496* (2013.01)

(58) Field of Classification Search
None
See application file for complete search history.

(56) References Cited

U.S. PATENT DOCUMENTS

| | | | |
|---|---|---|---|
| 6,055,854 A * | 5/2000 | Chen | 73/146.8 |
| 6,374,666 B1 * | 4/2002 | Lemberger et al. | 73/146.8 |
| 6,588,265 B1 * | 7/2003 | Roberson | 73/146.8 |
| 6,595,046 B2 * | 7/2003 | Lemberger et al. | 73/146.3 |
| 7,009,505 B2 * | 3/2006 | Huang | 340/442 |
| 7,251,994 B2 * | 8/2007 | Maldonado et al. | 73/146.8 |
| 7,493,808 B2 * | 2/2009 | Milanovich et al. | 73/146.8 |
| 8,393,349 B2 * | 3/2013 | Chen | 137/227 |
| 8,464,580 B2 * | 6/2013 | Paul | 73/146.8 |
| 2005/0072349 A1 * | 4/2005 | Perlin et al. | 116/34 B |

* cited by examiner

*Primary Examiner* — Peter MacChiarolo
*Assistant Examiner* — Jermaine Jenkins (57) ABSTRACT

The utility model provides a tire pressure monitor cap utilizing colors to indicate tire pressure. The tire pressure monitor cap comprises a transparent cover, an alarm bolt, a spring, a floating seat, a rubber pad, a ventilating plate, a metal housing and a gasket; the rubber pad includes a circular protruding seat having a wall higher than that of the outside wall, and a circumferential depression therein, wherein the center is provided with the conical portion, an circular groove arranged outside the protruding seat to receive a hard O-ring inserted thereinto and facilitate inner wall of the O-ring integrated with outer wall of the protruding seat; the O-ring not only increases intensity of the outer wall of the rubber pad by its hard plastic material, but also decreases pressure from the flange of the transparent cover. Moreover, the lower half portion of the body of the transparent cover inserted into the hollow recess and the whole flange inserted into the locating notch are facilitated the metal housing integrated tightly with the transparent cover and prevented the rubber pad from moving.

8 Claims, 7 Drawing Sheets

TIRE PRESSURE MONITOR CAP

FIELD OF THE INVENTION

The present invention relates to a tire pressure monitor cap utilizing colors to indicate tire pressure.

DESCRIPTION OF THE PRIOR ART

Figure 1:
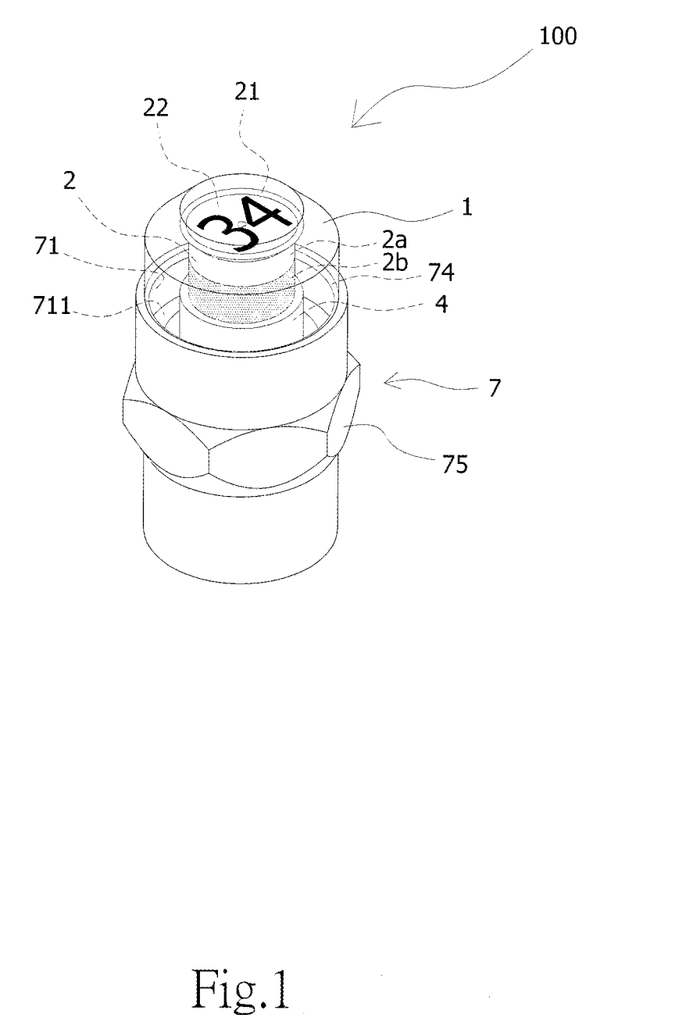
FIG. 1 is a perspective assembled view of the tire pressure monitor cap according to the present invention.
Figure 2:
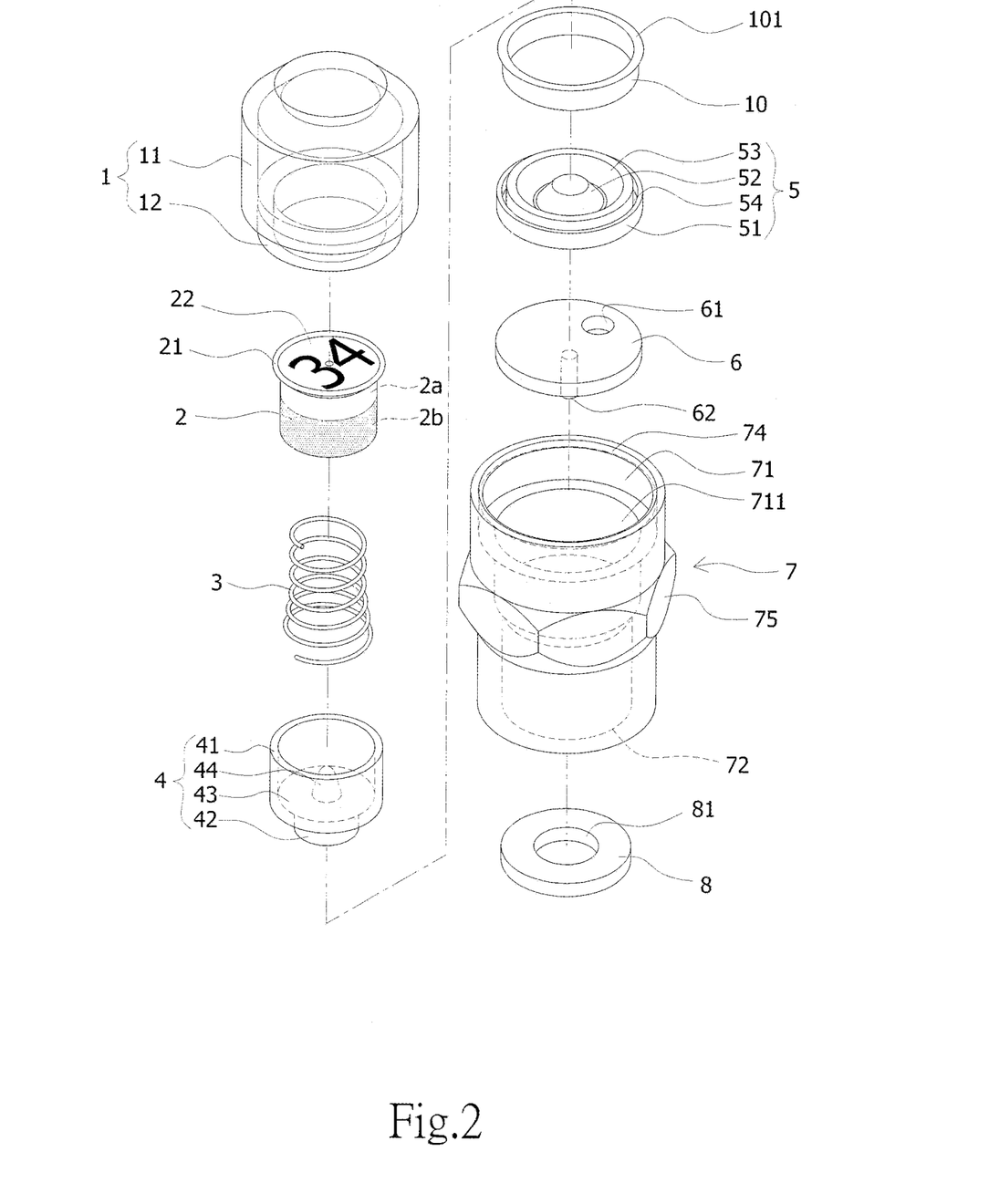
FIG. 2 is a perspective exploded view of the tire pressure monitor cap according to the present invention.

Refer to U.S. Pat. No. 5,886,254, the inventor has previously claimed a tire pressure cover, but here are the following disadvantages:
1. Refer to FIGS. 1 and 2, the flange 11 of the transparent cover 1 was inserted into the upper recess 23 of the metal housing 2 and fittingly coupled with each other, it may adversely affect the fixator stability after being used for a long time. Therefore, it is necessary for coupling with the transparent cover 1 and the metal housing 2 to be improved.
2. The rubber pad 4 still be movable in the upper recess 23 and deformed by pressure wherein it may adversely affect accuracy for the floating seat 5. Therefore, it is necessary for fixed in rubber pad 4 to be improved.
3. As the ventilating plate has two air vents 31, 32, air leakage rate is too high and too fast as it may adversely affect the safety. Therefore, it is necessary for minimizing the air leakage for the ventilating plate to be improved.
4. The central through hole 71 and the small bolt hole 24 are coupled for avoiding leakage of air, but it had increased assembly times.
5. The alarm bolt 6 has two different colors 62, 63, but when tire pressure are fully insufficient, the lower red color cannot show proper length. Therefore, it is necessary for the alarm bolt for adjust the red color length to be improved.
6. The raised portion 21 of outside of the metal housing 2 cannot use tool to rotate, and has no angle circle.
7. As the diameters of two ends of the spring are the same, the two ends of the spring 9 are easy to be deformed by pressure. Therefore, it is necessary for this problem to be improved.

SUMMARY OF THE INVENTION

The utility model using the following techniques: a tire pressure monitor cap comprises a transparent cover (1), an alarm bot (2), spring (3), a floating seat (4), a rubber pad (5), a ventilating plate (6), a metal housing (7), a gasket (8); which is characterized in that: the rubber pad (5) includes a circular protruding seat (55) having a wall higher than that of the outside wall (51), and a circumferential depression (53) therein, wherein the center is provided with the conical portion (52), an circular groove (54) arranged outside the protruding seat (55) to receive a hard O-ring (10) inserted thereinto and facilitate inner wall of the O-ring (10) integrated with outer wall of the protruding seat (55); a lower half portion of the body (11) inserted into the hollow recess (71) and the whole flange (12) inserted into the locating notch (711) are facilitated the metal housing (7) integrated tightly with the transparent cover (1); the rubber pad (5) fixed inside the locating notch (711) is caused by pressing the bottom of the flange (12) on top of the O-ring (10), only the conical portion (52) and the protruding seat (55) are floated by air pressure.

Secondly, the ventilating plate (6) has only one single air vent (61) at an eccentric position thereon.

Furthermore, the alarm bolt (2) has different upper (2a) and lower (2b) colors, the length of the upper color (2a) shorter than that of the lower (2b) and only one-third of the total length of the alarm bolt (2).

Moreover, the middle position of the metal housing (7) surface is provided with a hexagonal nut (75).

Besides, the top of inner side of the upper recess (71) is provided with a circular convex edge (74) for inserted into the body (11)

In addition, said spring (3) is a conical-shaped design, wherein one end of larger diameters inserted inside the top seat (41) and the smaller end is inserted inside the alarm bolt (2).

Moreover, the upper portion of gasket (8) is a horizontal plane surface located under the bottom of an interlayer (76) of the metal housing (7) and horizontally adjacent to each other.

Finally, the outer edge of the top part of the O-ring (10) is provided with an outwardly protruding projection (101).

DETAILED DESCRIPTION OF THE PREFERRED EMBODIMENT

Figure 3:
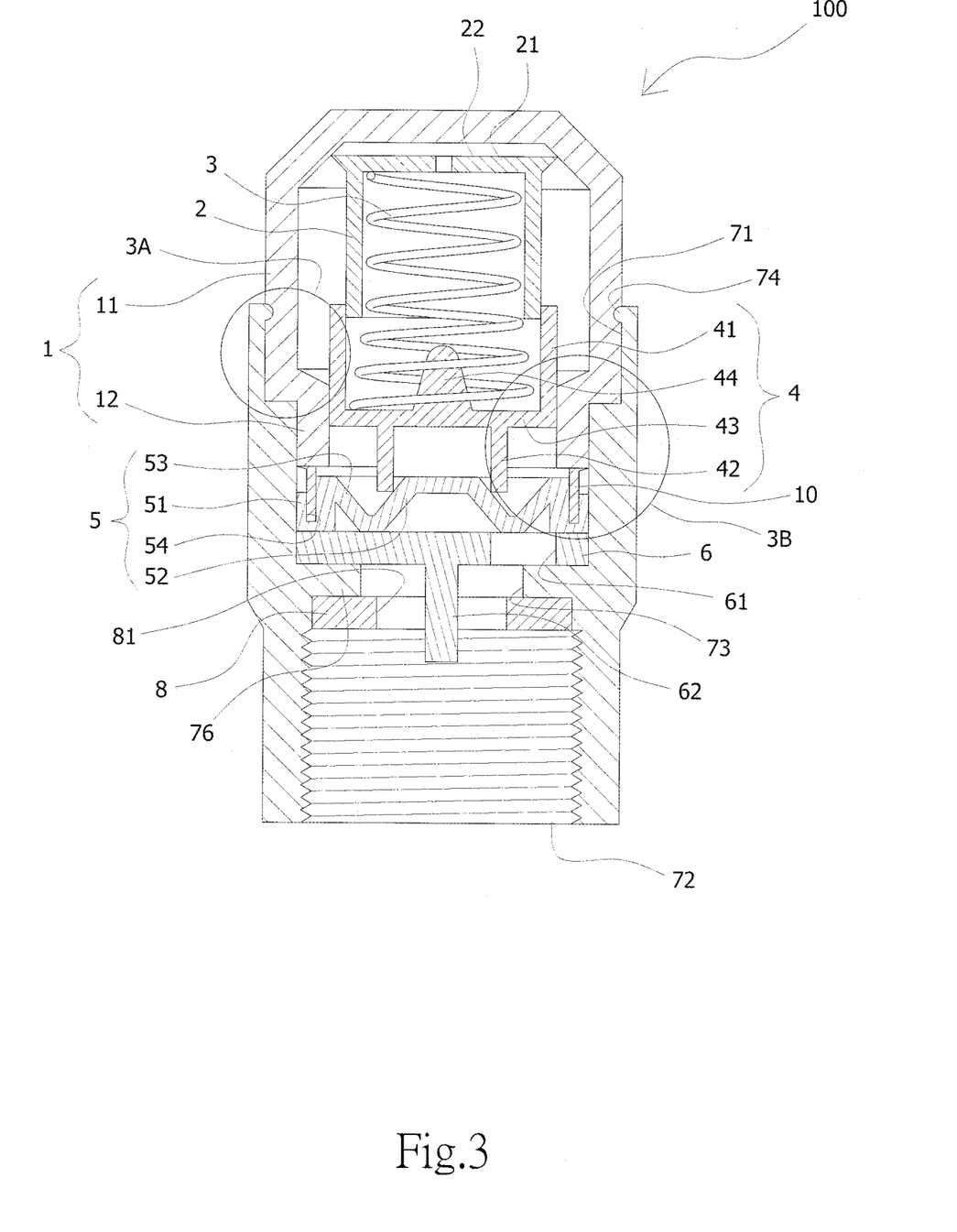
FIG. 3 is a sectional assembled view of the tire pressure monitor cap according to the present invention.

Refer to FIG. 1 to 3, the present invention discloses a tire pressure monitor cap 100 comprises a transparent cover (1), an alarm bot (2), spring (3), a floating seat (4), a rubber pad (5), a ventilating plate (6), a metal housing (7), a gasket (8);

an metal housing (7) provided with a hollow upper recess (71) at a upper end of its interior and a lower threaded hole (72) fitted with the tire nozzle (9), a locating notch (711) having a diameter slightly smaller than the hollow recess (71) and a small bolt hole (73) arranged between the locating notch (711) and the lower threaded hoe (72).

A gasket (8) arranged inside the lower threaded hole (72) and covered top of the tire nozzle (9) to prevent leakage, a central through hole (81) thereof;

an ventilating plate (6) arranged inside the locating notch (711), an air vent (61) for air passed by, an convex plug (62) at a central bottom side passing through the central through hole (81) and pressing a push pin (92) of a tire.

A circular rubber pad (5) is disposed on the air ventilating plate (6) provided with a conical portion (52) at the center;

a floating seat located at rubber pad (5) includes a hollow base (42), a hollow top seat (41) of a diameter larger than that of the base (42), a partition layer (43) between the top seat (41) and the base (42), and a projecting bolt (44) located at the center of the partition layer (43), the bottom side of the base (42) is arranged outside wall (51) of the conical portion (52).

An alarm bolt (2) embedded inside the top seat (41), A top side of the alarm bolt (2) is a round disk (21) on which a label or sticker (22) may adhere, the sticker (22) has markings number indicating the recommended tire pressure is value.

A spring (3) inserted into the top seat (41), a bottom end of the spring (3) surrounds the projecting bolt (44) whereas a top end thereof is fitted into the hollow alarm bolt (2);

a transparent cover (1) located on top of the metal housing (7) and covered the alarm bolt (2), the transparent cover (1) includes a hollow cylindrical body (11) provided with a flange (12) formed at a bottom portion thereof and having a diameter slightly smaller than that of the body.

Figure 4:
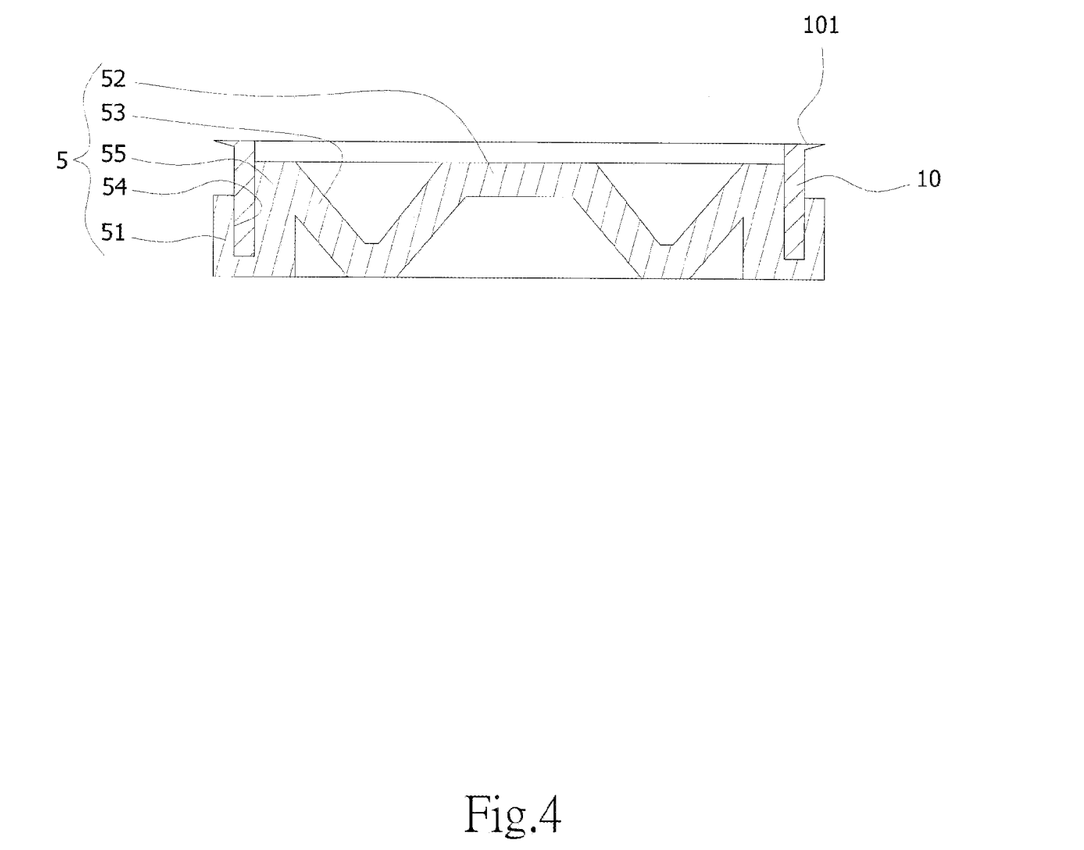
FIG. 4 is a sectional assembled view of rubber pad and O-ring of the tire pressure monitor cap according to the present invention.

Referring to FIGS. 2 and 4, the rubber pad (5) includes a circular protruding seat (55) having a wall higher than that of the outside wall (51), and a circumferential depression (53) therein, wherein the center is provided with the conical portion (52), an circular groove (54) arranged outside the protruding seat (55) to receive a hard O-ring (10) inserted thereinto and facilitate inner wall of the O-ring (10) integrated with outer wall of the protruding seat (55); the O-ring (10) not only increases intensity of the outer wall of the rubber pad (5) by its hard plastic material, but also decreases pressure from the flange (12) of the transparent cover (1). Furthermore, the outer edge of the top part of the O-ring (10) is provided with an outwardly protruding projection (101).

Figure 3A:
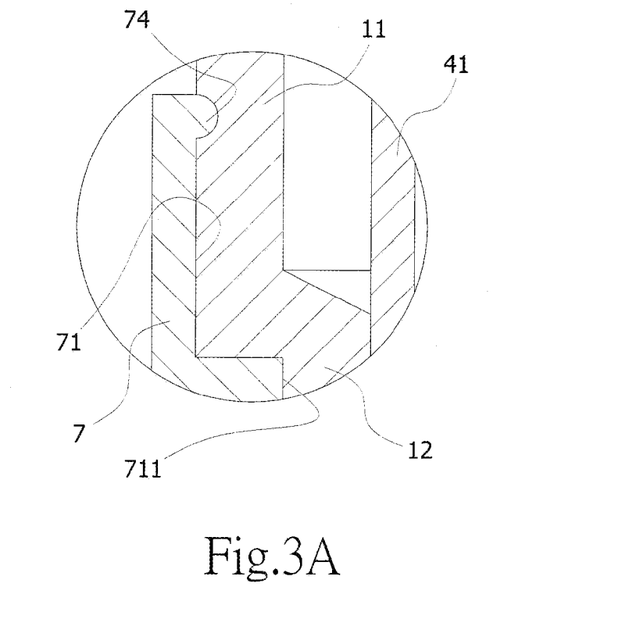
FIGS. 3A and 3B are enlarged partial view of the tire pressure monitor cap according to the present invention.

Moreover, refer to FIGS. 3 and 3A, a lower half portion of the body (11) inserted into the hollow recess (71) and the whole flange (12) inserted into the locating notch (711) are facilitated the metal housing (7) integrated tightly with the transparent cover (1).

Figure 3B:
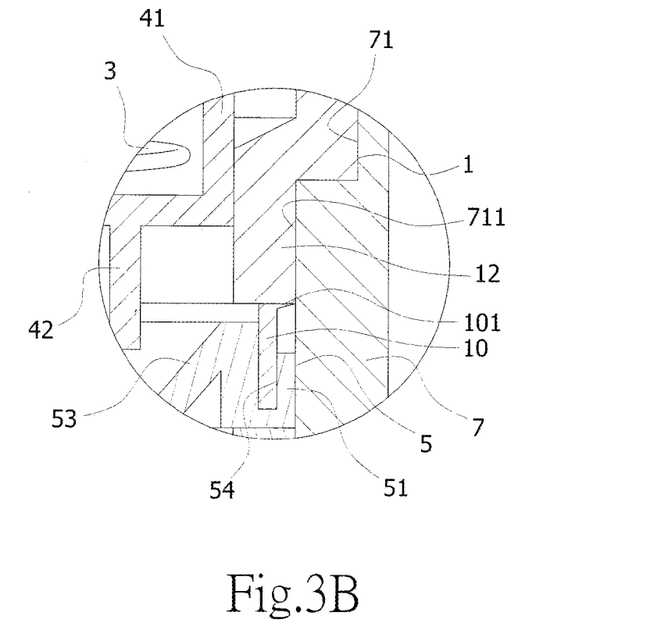

Referring to FIG. 3B, the rubber pad (5) fixed inside the locating notch (711) is caused by pressing the bottom of the flange (12) on top of the O-ring (10), only the conical portion (52) and the protruding seat (55) are floated by air pressure.

Secondly, the top of inner side of the upper recess (71) is provided with a circular convex edge (74) for inserted into the body (11), this can be integrated tightly with the metal housing (7) and the transparent cover (1).

The upper portion of gasket (3) is a horizontal plane surface located under the bottom of an interlayer (76) of the metal housing (7) and horizontally adjacent to each other wherein said alarm bolt (2) has different upper (2a) and lower (2b) colors, the length of the upper color (2a) shorter than that of the lower (2b) and only one-third of the total length of the alarm bolt (2).

FIG. 3 shows a tire pressure monitor cap (100) has not been connected to an air nozzle (9), at this point, the floating seat (4) is subjected to the action of the spring (3) and located relatively low inside the transparent cover (1), thus a green color of the floating seat is inside the metal housing (7).

After the tire pressure monitor cap (100) is coupled to the air nozzle (9) of the tire, as shown in FIG. 4, the convex plug (62) of the air ventilating plate (6) will urge against a push pin (92) inside the air nozzle (9) so that the push pin (92) lowers and forces a spring (91) to be compressed, further causing air pressure inside the tire to enter via an opening (93) of the air nozzle (9) into the tire pressure monitor cap (100). After the air has entered the tire pressure monitor cap (100), it will pass through the air vent (61) and force the conical portion (52) of the rubber pad (5) and the circumferential depression (53) to elevate, which in turn compels the floating seat (4) to rise and compress the spring (3);

since the spring (3) has elasticity different tire pressure will cause the floating seat (4) to rise to a different height. When the tire is fully inflated, the tire pressure will be greater than the force of the spring (3), so that the top seat (41) of the green floating seat (4) rises to the uppermost end. If the yellow upper portion (2a) is observed at the alarm bolt (2), this indicates that the tire pressure has slightly decreased, but there is still no need to inflate the tire.

Figure 5:
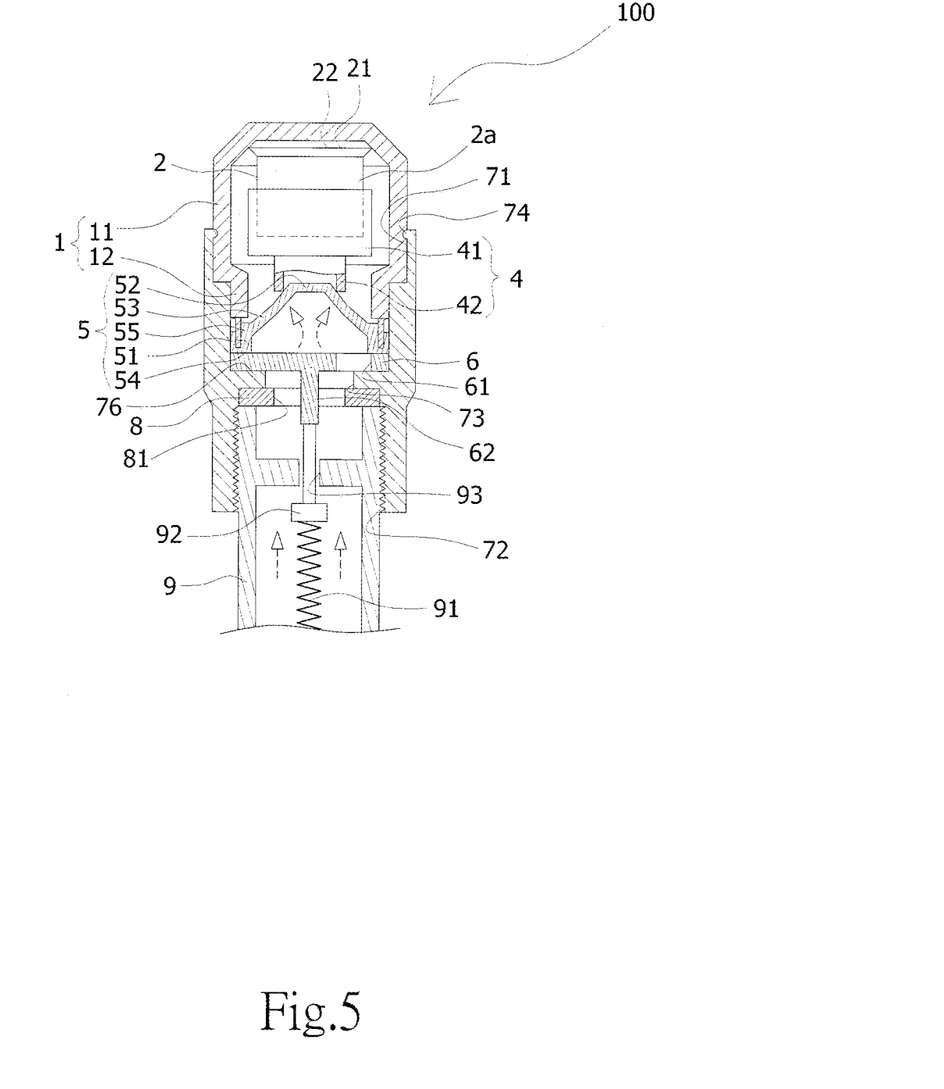
FIGS. 5 and 6 are respective schematic views illustrating operation of the tire pressure cover according to the present invention after it is coupled to an air nozzle of the tire.
Figure 6:
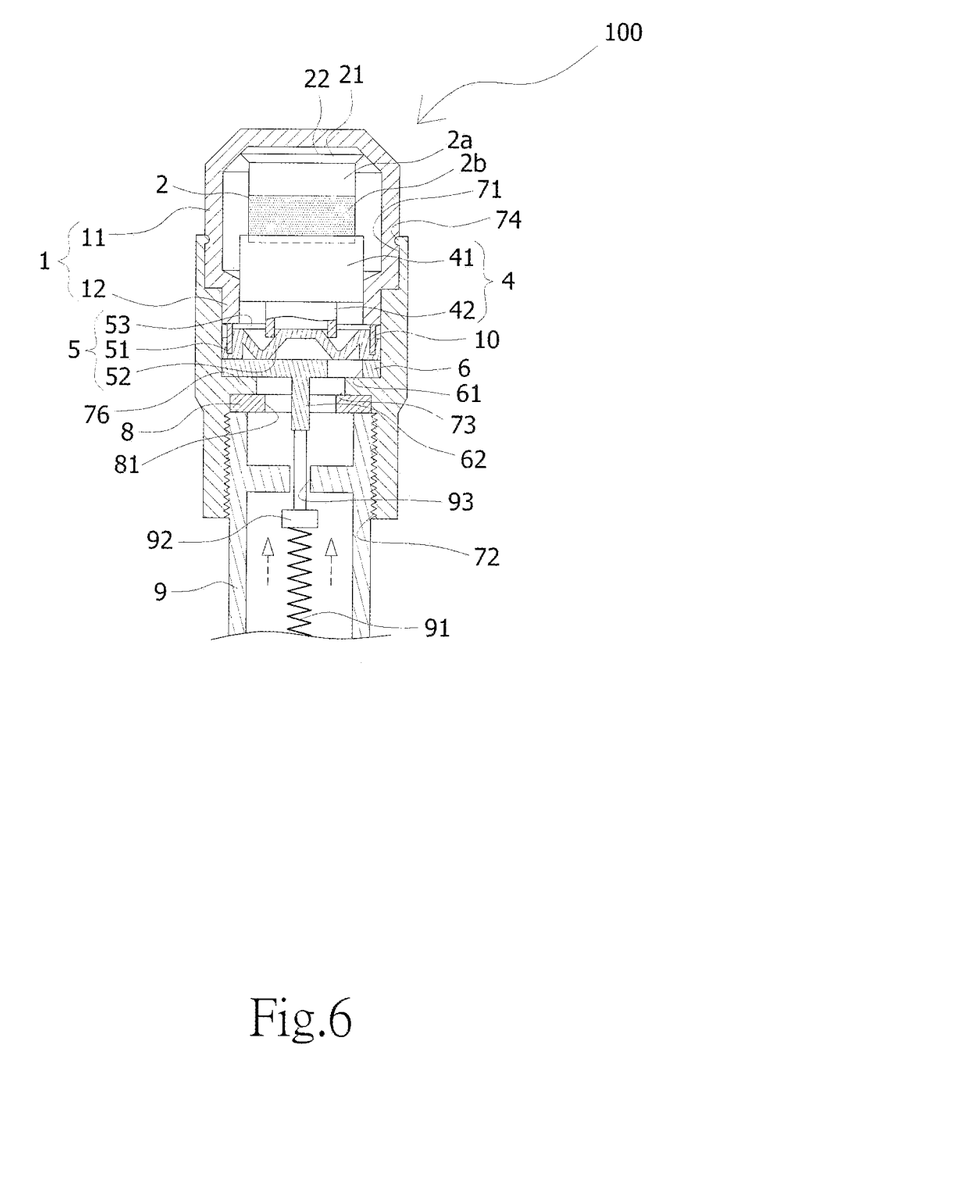

On the other hand, as shown in FIG. 5, if the red lower portion (2b) is shown at the alarm bolt (2), it indicates that the tire pressure is not enough and inflation is required to ensure driving safety.

Comparing to U.S. Pat. No. 5,886,254, the functions of the utility model as follows:

1. A lower half portion of the body (11) inserted into the hollow recess (71) and the whole flange (12) inserted into the locating notch (711) are facilitated the metal housing (7) integrated tightly with the transparent cover (1). Therefore, it has the advantage of difficult damage and stronger anti-leakage function; besides, the rubber pad (5) fixed inside the locating notch (711) is caused by pressing the bottom of the flange (12) on top of the O-ring (10), so it will not impact on the accuracy of the floating seat (4). Furthermore, O-ring (10) can enhance the structure of outer wall of the rubber pad (5) to avoid being deformed under the pressure.
2. The ventilating plate (6) has only one single air vent (61) at an eccentric position thereon; although air leakage can occur, one single air vent (61) can slow down air leakage rate by comparing to two air vents, thereby increasing safety.
3. The upper portion of gasket (8) is a horizontal plane surface located under the bottom of an interlayer (76) of the metal housing (7) and horizontally adjacent to each other, and the lower surface is coupled with the air nozzle (9), which not only can avoid air leakage, but also easy to assemble.
4. The length of the upper color (2a) shorter than that of the lower (2b) and only one-third of the total length of the alarm bolt (2), which can shorten yellow alarm time and early disclose red alarm, and increase security.
5. The middle position of the metal housing (7) surface is provided with a hexagonal nut (75), which can be rotated by tools. It has an advantage of being easy to remove and stable for combining.
6. The top of inner side of the upper recess (71) is provided with a circular convex edge (74) for insertion into the body (11), as shown in FIG. 3A, which can be tightly fixed with the metal housing (7) and the transparent cover (1) to avoid being damaged and opened.
7. The spring (3) is a conical-shaped design, wherein the diameter of one end is bigger than the other, so the structure is stable and not deformed by pressure.

I claim:

1. An improved tire pressure monitor cap (100) is installed on the nozzle (9), which includes an metal housing (7) provided with a hollow upper recess (71) at a upper end of its interior and a lower threaded hole (72) fitted with the tire nozzle (9), a locating notch (711) having a diameter slightly smaller than the hollow recess (71) and a small bolt hole (73) arranged between the locating notch (711) and the lower threaded hole (72);

a gasket (8) arranged inside the lower threaded hole (72) and covered top of the tire nozzle (9) to prevent leakage, a central through hole (81) thereof;

an ventilating plate (6) arranged inside the locating notch (711), an air vent (61) for air passed by, an convex plug (62) at a central bottom side passing through the central through hole (81) and pressing a push pin (92) of a tire;

a circular rubber pad (5) is disposed on the air ventilating plate (6) provided with a conical portion (52) at the center;

a floating seat located at rubber pad (5) includes a hollow base (42), a hollow top seat (41) of a diameter larger than that of the base (42), a partition layer (43) between the top seat (41) and the base (42), and a projecting bolt (44) located at the center of the partition layer (43), the bottom side of the base (42) is arranged outside wall (51) of the conical portion (52);

an alarm bolt (2) embedded inside the top seat (41), a top side of the alarm bolt (2) is a round disk (21) on which a label or sticker (22) may adhere, the sticker (22) has markings number indicating the recommended tire pressure value;

a spring (3) inserted into the top seat (41), a bottom end of the spring (3) surrounds the projecting bolt (44) whereas a top end thereof is fitted into the hollow alarm bolt (2);

a transparent cover (1) located on top of the metal housing (7) and covered the alarm bolt (2), the transparent cover (1) includes a hollow cylindrical body (11) provided with a flange (12) formed at a bottom portion thereof and having a diameter slightly smaller than that of the body; which is characterized in that:

the rubber pad (5) includes a circular protruding seat (55) having a wall higher than that of the outside wall (51), and a circumferential depression (53) therein, wherein the center is provided with the conical portion (52), an circular groove (54) arranged outside the protruding seat (55) to receive a hard O-ring (10) inserted thereinto and facilitate inner wall of the O-ring (10) integrated with outer wall of the protruding seat (55); a lower half portion of the body (11) inserted into the hollow recess (71) and the whole flange (12) inserted into the locating notch (711) are facilitated the metal housing (7) integrated tightly with the transparent cover (1); besides, the rubber pad (5) fixed inside the locating notch (711) is caused by pressing the bottom of the flange (12) on top of the O-ring (10), only the conical portion (52) and the protruding seat (55) are floated by air pressure.

2. The tire pressure monitor cap as claimed in claim 1, wherein said ventilating plate (6) has only one single air vent (61) at an eccentric position thereon.

3. The tire pressure monitor cap as claimed in claim 1, wherein said alarm bolt (2) has different upper (2a) and lower (2b) colors, the length of the upper color (2a) shorter than that of the lower (2b) and only one-third of the total length of the alarm bolt (2).

4. The tire pressure monitor cap as claimed in claim 1, the middle position of the metal housing (7) surface provided with a hexagonal nut (75).

5. The tire pressure monitor cap as claimed in claim 1, the top of inner side of the upper recess (71) is provided with a circular convex edge (74) for inserted into the body (11).

6. The tire pressure monitor cap as claimed in claim 1, said spring (3) is a conical-shaped design, wherein one end of larger diameters inserted inside the top seat (41) and the smaller end is inserted inside the alarm bolt (2).

7. The tire pressure monitor cap as claimed in claim 1, the upper portion of gasket (8) is a horizontal plane surface located under the bottom of an interlayer (76) of the metal housing (7) and horizontally adjacent to each other.

8. The tire pressure monitor cap as claimed in claim 1, the outer edge of the top part of the O-ring (10) is provided with an outwardly protruding projection (101).

\* \* \* \* \*